(12) United States Patent
Zhang

(10) Patent No.: US 10,061,070 B2
(45) Date of Patent: Aug. 28, 2018

(54) ASSEMBLY JIG FOR LED MODULE AND LIGHT GUIDE PLATE, AN ASSEMBLING METHOD AND A BACKLIGHT MODULE

(71) Applicant: Shenzhen China Star Optoelectronics Technology Co., Ltd., Shenzhen, Guangdong (CN)

(72) Inventor: Yanxue Zhang, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 578 days.

(21) Appl. No.: 14/423,115

(22) PCT Filed: Jan. 4, 2015

(86) PCT No.: PCT/CN2015/070068
§ 371 (c)(1),
(2) Date: Feb. 21, 2015

(87) PCT Pub. No.: WO2016/082309
PCT Pub. Date: Jun. 2, 2016

(65) Prior Publication Data
US 2016/0341864 A1 Nov. 24, 2016

(30) Foreign Application Priority Data
Nov. 27, 2014 (CN) .......................... 2014 1 0708744

(51) Int. Cl.
*F21V 8/00* (2006.01)
*B29D 11/00* (2006.01)
(Continued)

(52) U.S. Cl.
CPC ........ *G02B 6/002* (2013.01); *B29D 11/00673* (2013.01); *B29D 11/00721* (2013.01);
(Continued)

(58) Field of Classification Search
CPC .................. G02B 6/002; G02B 6/0065; B29D 11/00673; B29D 11/00721; B29K 2033/12; B29K 2069/00; B29K 2995/0018
(Continued)

(56) References Cited

U.S. PATENT DOCUMENTS

| 2007/0195551 A1* | 8/2007 | Shin | ..................... G02B 6/0021 362/612 |
| 2008/0158473 A1* | 7/2008 | Liang | ................ G02F 1/133308 349/60 |
| 2014/0138516 A1* | 5/2014 | Chen | ..................... B29C 45/263 249/184 |

FOREIGN PATENT DOCUMENTS

| CN | 102352990 A | 2/2012 | |
| CN | 203266465 U | * 11/2013 | ............. B25B 11/00 |

OTHER PUBLICATIONS

Xue Yinyan, English Translation of CN 203266465U, Nov. 6, 2013.*
Chen, Shi-Kun. English Translation of TW417397. Jan. 2001.*
English Translation of CN203266465U (Year: 2013).*

* cited by examiner

*Primary Examiner* — Matthew J Daniels
*Assistant Examiner* — Hana C Page
(74) *Attorney, Agent, or Firm* — Andrew C. Cheng

(57) ABSTRACT

The present invention discloses an assembly jig for assembling a LED module and a light guide plate, the LED module comprises a circuit board and LED mounted portions which are vertically arranged on the circuit board, and the assembly jig comprises a stripe body and a plurality of grooves with notches on the stripe body, wherein the grooves are spaced and disposed across at least two adjacent sides of the stripe body to contain and tightly contact with the non-mounting surface of the LED mounted portions opposite to the mount- (Continued)

ing surface. The present invention also discloses a backlight module and a method which is used for assembling a LED module and a light guide plate by ensuring the same distances between each of the LEDs to the light guide plate, furthermore to obtain relatively uniform backlighting and high optical taste of the backlight module.

5 Claims, 4 Drawing Sheets

(51) Int. Cl.
    *B29K 33/00*     (2006.01)
    *B29K 69/00*     (2006.01)

(52) U.S. Cl.
    CPC ........ *G02B 6/0065* (2013.01); *B29K 2033/12* (2013.01); *B29K 2069/00* (2013.01); *B29K 2995/0018* (2013.01)

(58) Field of Classification Search
    USPC ........................................................ 264/1.24
    See application file for complete search history.

ASSEMBLY JIG FOR LED MODULE AND LIGHT GUIDE PLATE, AN ASSEMBLING METHOD AND A BACKLIGHT MODULE

BACKGROUND OF THE INVENTION

1. Field of the Invention

The present invention relates to manufacturing of a backlight device, in particularly, to an assembly jig which is used for assembling a LED module and a light guide plate, an assembling method and a backlight module.

2. Description of Related Art

The edge-lit backlighting is the way common used in the mobile communication and tablet products, in particular for a LED (i.e. Light Emitting Diode) light sources are disposed on the sides of the light guide plate as an edge-lit backlight source. The light emitted from the edge-lit backlight source passes through a high-transmittance light guide plate to emit the display panel.

In most of the manufacturing process for a backlight module as shown in FIG. 1, the LED module 100 comprises a circuit board 101 and a plurality of LEDs 100a. The circuit board 101 comprises LED mounted portions 102. However, there would be a problem of misalignment among the plurality of LEDs 100a of the LED module 100 due to the plurality of LEDs 100a can't be arranged in a straight line perfectly after placing piece of LEDs 100a on the LED mounted portions 102 via a surface-mount technology. Also referring to the FIG. 2, in conventional invention, the shape of the light guide plate 200 is usually rectangle, it causes that not all of the distances (i.e. the distance of optical coupling) between the plurality of LEDs 100a and the light guide plate 200 are zero, and then affects the optical coupling efficiency, resulting in the brightness of the backlighting is not ideal and reducing the optical taste of the backlight module.

SUMMARY

In view of the deficiencies of the prior art, the present invention provides an assembly jig which is used for assembling a LED module and a light guide plate, an assembling method and a backlight module, ensuring the light emitted from the backlight module is relatively uniform, with a high optical taste.

To achieve the above object, the present invention adopts the following technical solution:

An assembly jig for assembling a LED module and a light guide plate, the LED module comprises a circuit board and LED mounted portions which are vertically arranged on the circuit board, and the assembly jig comprises a stripe body and a plurality of grooves with notches on the stripe body; wherein the grooves are spaced and disposed across at least two adjacent sides of the stripe body to contain and tightly contact with the non-mounting surface of the LED mounted portions opposite to the mounting surface.

Wherein the cross-section of the grooves parallel to the mounting surface is rectangle.

Probably the cross-section of the grooves parallel to the mounting surface is inverted-trapezoid.

The present invention also provides a method for assembling a LED module and a light guide plate by using the said assembly jig, comprising the steps of:

S01. Playing pieces of LEDs to the LED mounted portions on the circuit board;

S02. Placing the LED module and the assembly jig into the light guide plate mold, enchasing the LED mounted portions into the grooves of the assembly jig so as to enable the bottom surfaces of the grooves tightly contacting with the non-mounting surface of the LED mounted portions opposite to the mounting surface;

S03. Injecting an injection molding material into the light guide plate mold to form a light guide plate;

S04. Removing the LED module and the light guide plate from the mold, then stripping off the assembly jig.

Wherein the injection molding material is polycarbonate; probably the injection molding material is polymethylmethacrylate.

The present invention also provides a backlight module, the injection molding method for assembling a LED module and a light guide plate by using the above-described method.

The present invention provides an assembling method and an assembly jig used for assembling a LED module and a light guide plate. With the same distances between a plurality of LEDs and a light guide plate, ensuring the light emitted from the backlight module is relatively uniform, with a high optical taste.

DETAILED DESCRIPTION OF EMBODIMENTS

To make the objects, technical solutions and advantages of the present invention will be more clearly understood, the accompanying drawings and the following embodiments of the present invention will be described in further detail. It should be understood that the specific embodiments described herein only to explain the present invention and are not intended to limit the present invention.

Figure 1:
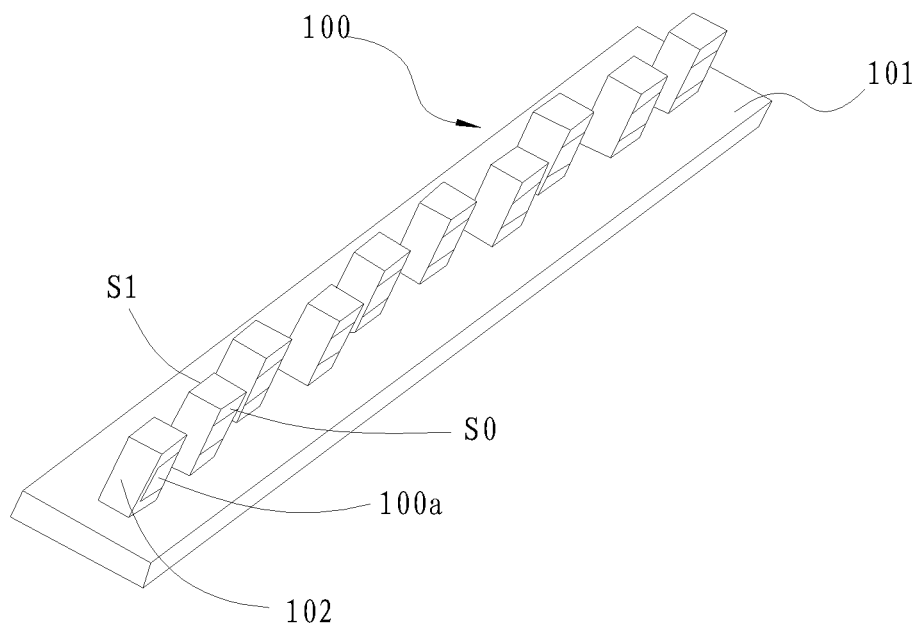
FIG. 1 is a schematic structural view of a prior art showing a LED module.
Figure 2:
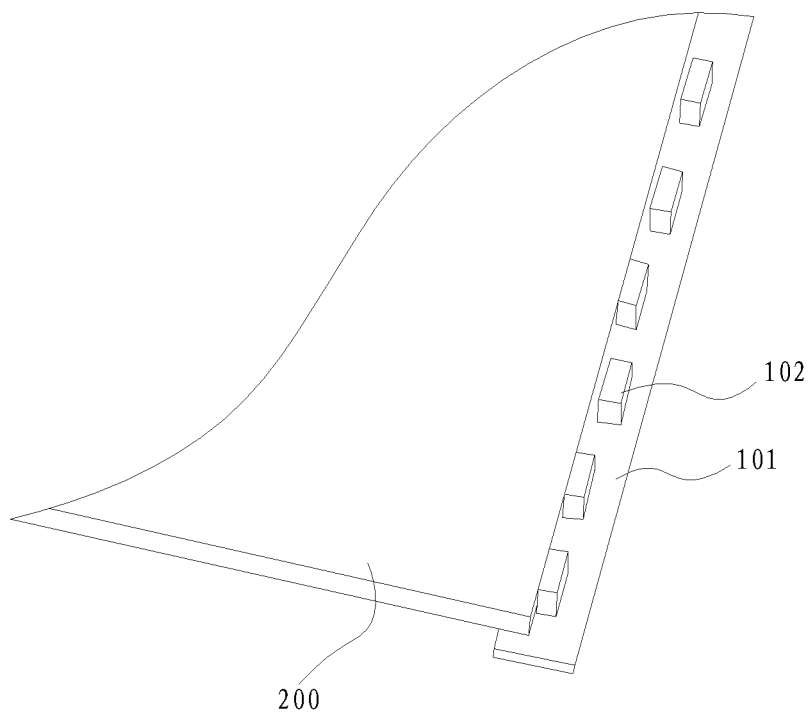
FIG. 2 is a schematic structural view of a prior art showing an installation for a LED module and a light guide plate.
Figure 3:
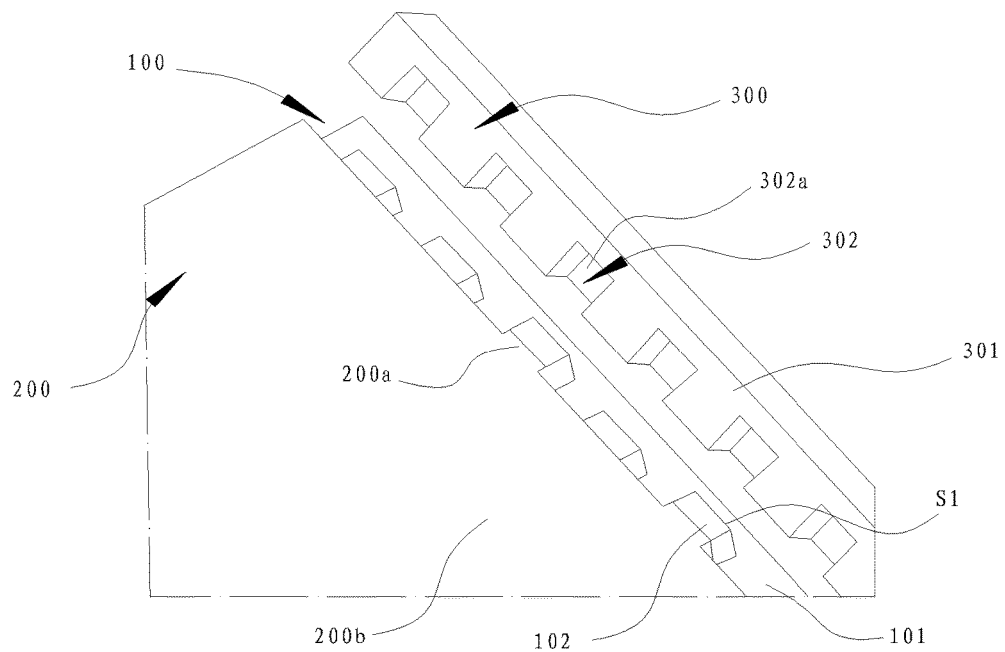
FIG. 3 is a schematic structural view of the embodiment of the present invention showing an assembly jig used in assembling a LED module and a light guide plate.

Please refer to FIG. 1 to FIG. 3, the present invention provides an assembly jig 300 which is used for assembling a LED module 100 and a light guide plate 200. The LED module 100 comprises a circuit board 101 and LED mounted portions 102 for mounting LEDs 100a on thereof. In general, the LED mounted portions 102 are vertically arranged on the circuit board 100. The assembly jig 300 comprises a stripe body 301 and a plurality of grooves 302 with notches on the stripe body 301, wherein either of the grooves 302 is spaced from each other and disposed across at least two adjacent sides of the stripe body 301 to contain and tightly contact with the non-mounting surface S1 of the LED mounted portions 102 opposite to the mounting surface S0. The spacing between the grooves is in coincidence with the spacing of LEDs on the LED module 100.

Figure 4:
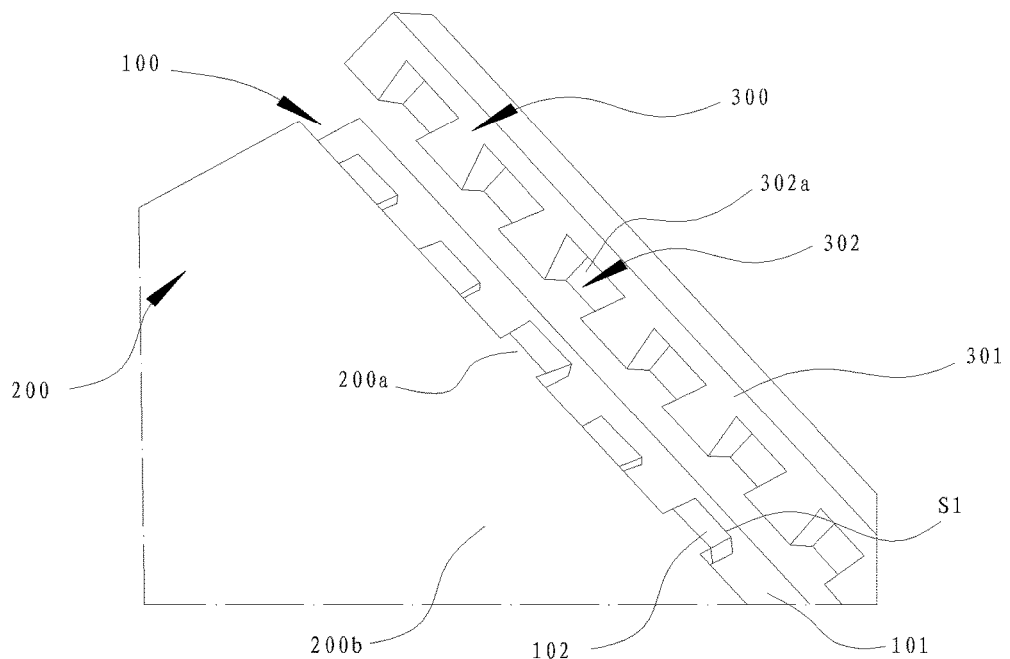
FIG. 4 is a schematic structural view of another embodiment of the present invention showing an assembly jig used in assembling a LED module and a light guide plate.

In FIG. 3, the cross-section of the grooves 302 parallel to the mounting surface S0 is rectangle and it is in coincidence with the LED mounted portions 102. FIG. 4 is a schematic structural view of another embodiment of the present invention for an assembly jig used in assembling a LED module and a light guide plate. In this embodiment, each of the LED mounted portions 102 is a trapezoidal block inversely mounted on the circuit board 101, i.e. each upper free end of the LED mounted portions 102 is larger than the opposite end which is connecting to the circuit board 101. Accordingly, each shape of the grooves 302 is in coincidence with the LED mounted portions 102, i.e. the each shape of the grooves 302 parallel to the mounting surface S0 is also inverted-trapezoid, each upper end of the grooves 302 is larger than the bottom end of the grooves 302. With this arrangement, the LED mounted portions 102 can't be come off in the vertical direction after moving horizontally the LED mounted portions 102 into the grooves 302, ensuring the coupling reliability of the LED mounting portion 102 with the assembly jig 300, even it is advantageous for further injection molding process.

Figure 5:
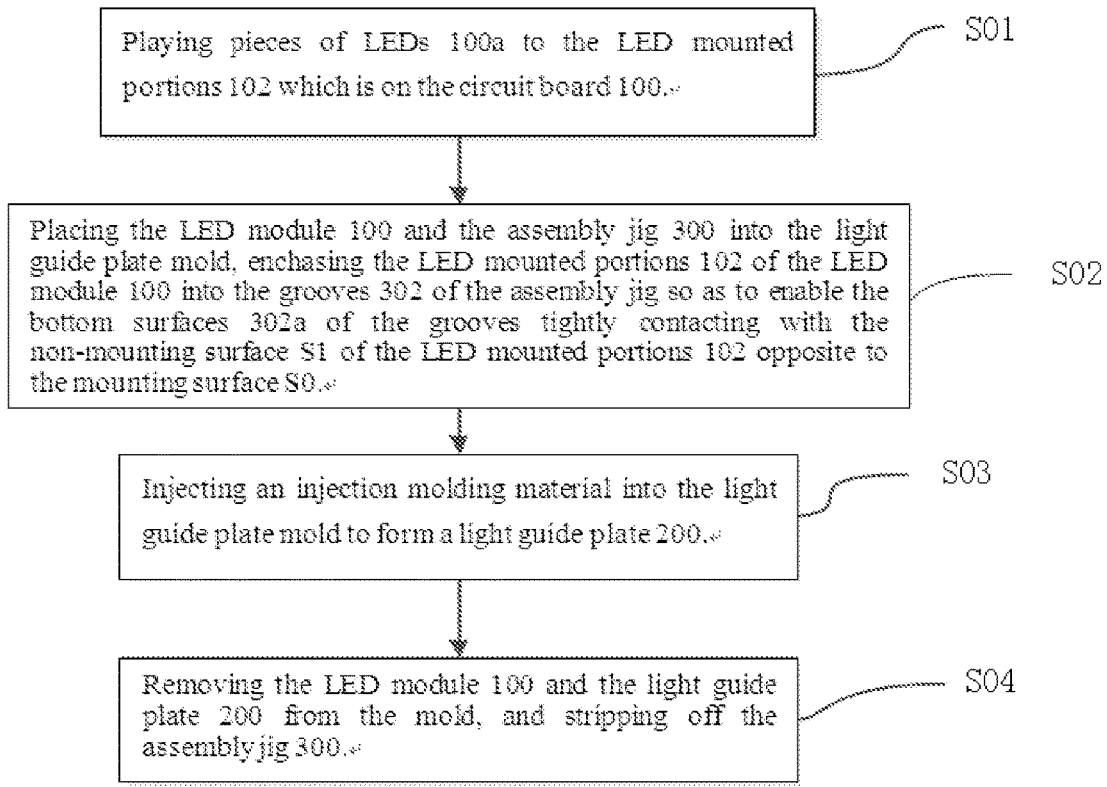
FIG. 5 is a schematic diagram of the embodiment of the present invention showing a method for assembling a LED module and a light guide plate.

In conjunction with FIG. 3 to FIG. 5, the embodiment of the present invention provides an assembling method by using an above-described assembly jig for assembling a LED module 100 and a light guide plate 200, the method comprising:

S01. Playing pieces of LEDs 100a to the LED mounted portions 102 which is on the circuit board 100;

S02. Placing the LED module 100 and the assembly jig 300 into the light guide plate mold, enchasing the LED mounted portions 102 of the LED module 100 into the grooves 302 of the assembly jig so as to enable the bottom surface 302a of the grooves 302 tightly contacting with the surface which is opposite to the LED mounting surface S0 of the LED mounted portions 102. The LED mounting surface S0 of the LED mounted portions 102 faces to the light guide plate 200, with LEDs 100a mounted on thereof;

S03. Injecting an injection molding material into the light guide plate mold to form a light guide plate 200;

S04. Removing the LED module 100 and the light guide plate 200 from the mold, then stripping off the assembly jig 300.

In the embodiment of the present invention, the PC (polycarbonate) material was used as the injection molding material. The PC material can fill the voids between the LEDs 101a and the main structure 200b of the light guide plate during the injection molding process. The non-mounting surface S1 which is opposite the LED mounting surface S0 contacts tightly with the bottom surface 302a of the grooves 302. Be appreciated that in other embodiments, the injection molding material may also be made of Acrylic (i.e. polymethylmethacrylate).

Figure 6:
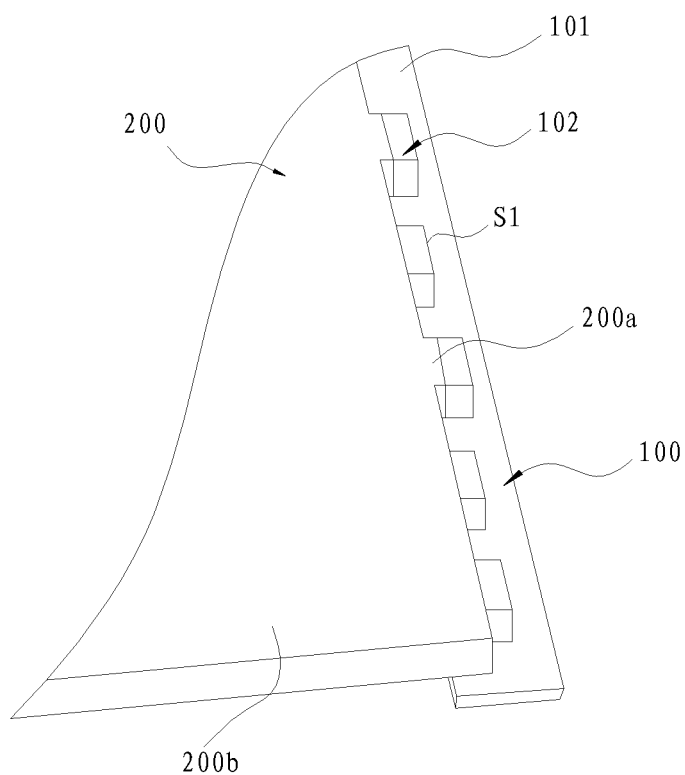
FIG. 6 is a schematic structural view of the embodiment of the present invention showing an assembly of a LED module and a light guide plate in a backlight module.

Further in conjunction with FIG. 6, a schematic structural view of the embodiment of the present invention showing an assembly of a LED module and a light guide plate in a backlight module. In this embodiment, the above-described assembling method is used to assemble the LED module 100 and the light guide plate 200. By placing the LED module 100 and the assembly jig 300 into the light guide mold, then enchasing the LED mounted portions 102 of the LED module 100 into the grooves 302 of the assembly jig to enable the bottom surface 302a of the grooves 302 tightly contacting with the non-mounting surface S1 which is opposite to the LED mounting surface S0 of the LED mounted portions 102, wherein the LED mounting surface S0 of the LED mounted portions 102 faces to the light guide plate 200, with LEDs 100a mounted on thereof. After that, injecting an injection molding material into the light guide plate mold to form a light guide plate 200 so as to complete assembling of the LED module 100 and the light guide plate 200 in injection molding process. The light guide plate 200 comprises a plurality of protrusions 200a which are tightly contacting with the corresponding LEDs 100a after the injection molding process. The projecting length of the protrusions 200a over the main structure 200b of the light guide plate can complement the clearance between the LED mounted portions 102 and the main structure 200b of the light guide plate, then ensuring all the distances from each of the LEDs 100a to the light guide plate 200 are zero, furthermore to obtain relatively uniform backlighting and high optical taste of the backlight module.

The above are only specific embodiments of the present application, it should be noted that those of ordinary skill in the art, in the present application without departing from the principles of the premise, but also a number of improvements and modifications can be made, these improvements and retouching also be considered the scope of the present application.

What is claimed is:

1. A method for assembling an LED module and a light guide plate by using an assembly jig which comprises a strip body, a plurality of grooves on the strip body, wherein the grooves are spaced and disposed across at least two adjacent sides of the strip body to contain and tightly contact with the non-mounting surface of the LED mounted portions opposite to the mounting surface, the method comprising the following steps:
   disposing pieces of LEDs to the LED mounted portions on the circuit board;
   disposing the LED module and the assembly jig into the light guide plate mold, encasing the LED mounted portions into the grooves of the assembly jig so as to enable the bottom surfaces of the grooves tightly contacting with the non-mounting surface of the LED mounted portions opposite to the mounting surface;
   injecting an injection molding material into the light guide plate mold to form a light guide plate;
   removing the LED module and the light guide plate from the mold, and
   stripping off the assembly jig.

2. The method in claim 1, wherein the cross-section of the grooves parallel to the mounting surface is rectangle.

3. The method in claim 1, wherein the cross-section of the grooves parallel to the mounting surface is inverted-trapezoid.

4. The method in claim 1, wherein the injection molding material is polycarbonate.

5. The method in claim 1, wherein the injection molding material is polymethylmethacrylate.

* * * * *